United States Patent
Kiyokami et al.

(10) Patent No.: US 11,506,094 B2
(45) Date of Patent: Nov. 22, 2022

(54) LUBRICATING DEVICE OF POWER TRANSMITTING SYSTEM

(71) Applicant: TOYOTA JIDOSHA KABUSHIKI KAISHA, Toyota (JP)

(72) Inventors: Hiroaki Kiyokami, Toyota (JP); Kazuki Iwakura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 365 days.

(21) Appl. No.: 16/390,157

(22) Filed: Apr. 22, 2019

(65) Prior Publication Data
US 2019/0323394 A1 Oct. 24, 2019

(30) Foreign Application Priority Data
Apr. 20, 2018 (JP) .............................. JP2018-081683
Jul. 3, 2018 (JP) .............................. JP2018-127152

(51) Int. Cl.
*F01M 11/02* (2006.01)
*F01M 1/02* (2006.01)
(Continued)

(52) U.S. Cl.
CPC .............. *F01M 11/02* (2013.01); *F01M 1/02* (2013.01); *F16H 57/0421* (2013.01);
(Continued)

(58) Field of Classification Search
CPC .. F01M 11/02; F01M 1/02; F16N 7/38; F16N 21/00; F16N 2210/12; F16N 2210/14;
(Continued)

(56) References Cited

U.S. PATENT DOCUMENTS 1,638,428 A * 8/1927 Zander .................... E01F 5/005
138/157
2,262,627 A * 11/1941 Whitesell, Jr. ...... F01N 13/1805
285/288.1
(Continued)

FOREIGN PATENT DOCUMENTS

JP         H07-080938 A      3/1995
JP         2014-009744 A     1/2014
(Continued)

OTHER PUBLICATIONS

JP-2018063037-A—Machine Translation (Year: 2018).*

*Primary Examiner* — Michael A Riegelman
(74) *Attorney, Agent, or Firm* — Oliff PLC

(57) ABSTRACT

A lubricating device of a power transmitting system having a structural member. The lubricating device includes an oil piping assembly fixed to the structural member at a plurality of positions and having an oil passage through which a lubricant oil flows. The oil piping assembly is a resin piping assembly including a plurality of divisional components which cooperate to define a circumference of the oil passage along a length of the oil passage and which are formed of a resin material. The divisional components have respective interfacial surfaces and are bonded together with interfacial surfaces thereof being held in contact with each other. The divisional components of the resin piping assembly include a base divisional component provided with a plurality of fixing portions, and the resin piping assembly is fixed to the structural member at the plurality of positions through only the fixing portions.

8 Claims, 8 Drawing Sheets

(51) Int. Cl.
*F16N 7/38* (2006.01)
*F16N 21/00* (2006.01)
*F16H 57/04* (2010.01)

(52) U.S. Cl.
CPC ........... *F16H 57/0436* (2013.01); *F16N 7/38* (2013.01); *F16N 21/00* (2013.01); *F16N 2210/12* (2013.01); *F16N 2210/14* (2013.01); *F16N 2210/18* (2013.01); *F16N 2210/20* (2013.01)

(58) Field of Classification Search
CPC ............. F16N 2210/18; F16N 2210/20; F16H 57/0421; F16H 57/0436
See application file for complete search history.

(56) References Cited

U.S. PATENT DOCUMENTS

| | | | | |
|---|---|---|---|---|
| 2,736,451 | A * | 2/1956 | Fogg | H02G 3/088 220/3.8 |
| 5,992,369 | A * | 11/1999 | Mehne | F02M 35/10347 123/184.21 |
| 6,247,500 | B1 * | 6/2001 | McMahon | F16L 9/22 138/157 |
| 7,451,541 | B2 * | 11/2008 | Stastny | F16L 9/17 138/157 |
| 8,181,745 | B1 * | 5/2012 | Stanfield | F01M 11/03 184/1.5 |
| 11,073,235 | B2 * | 7/2021 | Kiyokami | B29C 66/547 |
| 2008/0023095 | A1 * | 1/2008 | Burrows | A47L 15/4219 138/158 |
| 2015/0128738 | A1 * | 5/2015 | Ono | F16H 57/0494 74/339 |
| 2016/0025205 | A1 * | 1/2016 | Smith | F16H 57/0436 184/6.12 |
| 2017/0361541 | A1 * | 12/2017 | Ueno | B29C 66/242 |
| 2019/0017590 | A1 * | 1/2019 | Kidokoro | F16K 27/04 |
| 2019/0145509 | A1 * | 5/2019 | Yu | F16H 57/0421 184/11.1 |
| 2019/0323394 | A1 * | 10/2019 | Kiyokami | F16H 57/0441 |
| 2019/0323642 | A1 * | 10/2019 | Kiyokami | F01M 11/02 |
| 2020/0010072 | A1 * | 1/2020 | Iwakura | F16H 57/0436 |
| 2020/0032895 | A1 * | 1/2020 | Kiyokami | F16H 57/0457 |
| 2020/0240511 | A1 * | 7/2020 | Hori | F16H 57/0424 |

FOREIGN PATENT DOCUMENTS

| | | | | |
|---|---|---|---|---|
| JP | 2015-086984 | A | | 5/2015 |
| JP | 2015-094389 | A | | 5/2015 |
| JP | 2018063037 | A * | 4/2018 | ............ F16H 48/08 |
| WO | WO-2017146263 | A1 * | 8/2017 | ........... F16K 27/041 |

* cited by examiner

LUBRICATING DEVICE OF POWER TRANSMITTING SYSTEM

This application claims priority from Japanese Patent Applications Nos. 2018-081683 filed on Apr. 20, 2018 and 2018-127152 filed on Jul. 3, 2018, the disclosures of which are herein incorporated by reference in its entirety.

FIELD OF THE INVENTION

The present invention relates to a lubricating device of a power transmitting system, and more particularly to an improvement of a lubricating device including a resin piping assembly having a plurality of divisional components which are bonded together to define an oil passage.

BACKGROUND OF THE INVENTION

There is known a lubricating device of a power transmitting system, which has an oil piping disposed within a casing of the power transmitting system, so that a lubricant oil is supplied through the oil piping to the power transmitting system. JP2015-86984A discloses an example of this type of lubricating device. JP2014-9744A discloses a resin piping assembly including a plurality of divisional components which cooperate to define a circumference of an oil passage along a length of the oil passage and which are bonded together with interfacial surfaces of the divisional components being held in contact with each other. It is to be understood that a concept of "lubrication" referred to in the present application is interpreted to mean not only a supply of a lubricant oil to desired parts of the power transmitting system to prevent friction or wearing of these desired parts, but also a supply of the lubricant oil to the desired parts to cool these parts.

SUMMARY OF THE INVENTION

By the way, it is considered that the plurality of divisional components of the resin piping assembly are bonded together by a vibration welding process as described in JP7-80938A, for instance. To use the resin piping assembly as an oil piping of the lubricating device, the resin piping assembly is provided with a plurality of fixing portions to fix the resin piping assembly to a structural member (casing, for example) of the power transmitting system at a plurality of positions of the structural member. A load may be applied to the plurality of fixing portions, so as to cause a relative displacement of the fixing portions, due to a difference in thermal expansion coefficient between the resin piping assembly and the structural member, and/or vibration of the power transmitting system. This load is also applied to the interfacial surfaces of the plurality of divisional components bonded together, so that there is a risk of separation of the interfacial surfaces away from each other. Although an increase of areas of the interfacial surfaces is effective to increase the strength of bonding of the divisional components, this increase undesirably results in an increase of the weight and/or size of the resin piping assembly.

The present invention was made in view of the background art described above. It is therefore an object of the present invention to provide a lubricating device of a power transmitting system, which uses a resin piping assembly including a plurality of divisional components bonded together with interfacial surfaces of the divisional components being held in contact with each other, to define a circumference of an oil passage, and which is configured to have an increased resistance to separation of the interfacial surfaces of the divisional components away from each other due to a difference in thermal expansion coefficient between the resin piping assembly and a structural member of the power transmitting system, and/or vibration of the power transmitting system.

The object indicated above is achieved according to the following modes of the present invention:

According to a first mode of the invention, there is provided a lubricating device of a power transmitting system having a structural member, comprising an oil piping assembly fixed to the structural member at a plurality of positions and having an oil passage through which a lubricant oil flows, wherein the oil piping assembly is a resin piping assembly including a plurality of divisional components which cooperate to define a circumference of the oil passage and which are formed of a resin material, and the divisional components have respective interfacial surfaces and are bonded together with interfacial surfaces thereof being held in contact with each other. The plurality of divisional components of the resin piping assembly include a base divisional component provided with a plurality of fixing portions, and the resin piping assembly is fixed to the structural member at the plurality of positions through only the plurality of fixing portions. The structural member is a member provided at a certain position of the power transmitting system, such as, a casing of the power transmitting system, an oil pump fixed to the casing, a valve body of the power transmitting system or a heat exchanger.

According to a second mode of the invention, the lubricating device according to the first mode of the invention further comprises an oil pump disposed within a casing of the power transmitting system, and the resin piping assembly is connected to the oil pump, to deliver the lubricant oil. Further, one of the plurality of fixing portions is fixed to a housing of the oil pump functioning as the structural member, and the base divisional component is provided with a connecting portion which is connected to the oil pump and through which the lubricant oil flows from the oil pump into the resin piping assembly.

According to a third mode of the invention, the lubricating device according to the second mode of the invention is configured such that the resin piping assembly is provided to deliver the lubricant oil from the oil pump to predetermined lubricated portions of the power transmitting system, and at least one of the plurality of divisional components including the base divisional component is provided with a plurality of hollow nozzle portions. Each of the hollow nozzle portions has a delivery nozzle which is open externally of the hollow nozzle portion.

According to a fourth mode of the invention, the lubricating device according to any one of the first, second and third modes of the invention is configured such that a length of an inner wall surface of the base divisional component partly defining the oil passage is larger than a length of an inner wall surface of another of the plurality of divisional components partly defining the oil passage, in a cross section taken in a plane perpendicular to a direction of flow of the lubricant oil through the oil passage.

According to a fifth mode of the invention, the lubricating device according to any one of the first through fourth modes of the invention is configured such that the plurality of divisional components including the base divisional component are bonded together by welding with the interfacial surfaces thereof being held in contact with each other.

In the lubricating device according to the first mode of the invention, the base divisional component which is one of the plurality of divisional components of the resin piping assembly is provided with the plurality of fixing portions, so that the resin piping assembly is fixed through only these fixing portions to the structural member of the power transmitting system at the plurality of positions. Accordingly, even where a load is applied to the plurality of fixing portions, with a result of a relative displacement of the fixing portions, due to a difference in thermal expansion coefficient between the resin piping assembly and the structural member, and/or vibration of the power transmitting system, this load acts on only the base divisional component, so that the other divisional components are displaceable following a displacement of the base divisional component, whereby a load acting on the interfacial portions of the divisional components bonded together can be reduced. As a result, the state of bonding of the base divisional component to the other divisional components is stably maintained irrespective of the above-indicated difference of the thermal expansion coefficient and/or vibration, so that it is not necessary to increase the areas of the interfacial surfaces, for increasing the strength of bonding of the divisional components. In addition, the resin piping assembly can be manufactured with reduced weight and size at a reduced cost of manufacture.

In the lubricating device according to the second mode of the invention wherein the oil pump is disposed within the casing of the power transmitting system, the lubricant oil is delivered from the oil pump into the resin piping assembly, and one of the plurality of fixing portions is fixed to the oil pump. Further, the base divisional component is provided with the connecting portion connected to the oil pump. Accordingly, the base divisional component is positioned by the oil pump, so that a risk of dislocation of the connecting portion relative to the oil pump can be reduced. In this respect, it is noted that where the connecting portion connected to the oil pump was provided on the divisional component other than the base divisional component, application of a load causing a relative displacement between the connecting portion and the above-indicated one fixing portion due to differences of thermal expansion coefficient among various parts of the lubricating device and/or due to vibrations of those parts would cause application of a load between the base divisional component and the other divisional component provided with the connecting portion, which two components are bonded together, so that these two components might be separated from each other. In this second mode of the invention, however, the connecting portion and the fixing portion are both provided on the base divisional component, so that the load to be applied between the base divisional component and the other divisional component can be reduced, whereby the state of mutual bonding of the base and other divisional components is stably maintained.

In the lubricating device according to the third mode of the invention wherein the lubricant oil supplied from the oil pump is delivered through the resin piping assembly to the predetermined lubricated portions of the power transmitting system, at least one of the plurality of divisional components including the base divisional component is provided with the plurality of hollow nozzle portions each having the delivery nozzle, which is open externally of the hollow nozzle portion. Accordingly, the lubricant oil can be adequately delivered to the lubricated portions of the power transmitting system through the hollow nozzle portions, by suitably determining lengths of the hollow nozzle portions and/or the direction in which the delivery nozzles are open.

In the lubricating device according to the fourth mode of the invention, the length of the inner wall surface of the base divisional component is larger than the length of the inner wall surface of another divisional component, in the cross section in the plane perpendicular to the direction of flow of the lubricant oil through the oil passage, so that the base divisional component has a high degree of rigidity resistant to twisting and bending of the base divisional component, whereby it is possible to reduce a degree of twisting or other deformation of the resin piping assembly at the bonding interface between the base divisional component and the above-indicated another divisional component, when a load is applied to the base divisional component through the plurality of fixing portions, due to the difference in thermal expansion coefficient between the resin piping assembly and the structural member, and/or due to vibration of the power transmitting system. Accordingly, the load applied to the bonding interface is reduced, so that the state of mutual bonding of the base and another divisional components can be further stably maintained.

In the lubricating device according to the fifth mode of the invention, the plurality of divisional components including the base divisional component are bonded together by welding with the interfacial surfaces thereof being held in contact with each other. To increase the strength of bonding of the divisional components for preventing a risk of separation of their interfacial surfaces from each other, due to the differences of thermal expansion coefficient among the various parts of the lubricating device and/or vibrations of those parts, it is required to increase the areas of the interfacial surfaces, so that the weight and size of the resin piping assembly are increased. According to the present invention, however, the plurality of fixing portions are all provided on the base divisional component, so that a load applied between the plurality of divisional components due to the above-indicated thermal expansion coefficient differences and/or vibrations is reduced, whereby the state of mutual bonding of the divisional components can be stably maintained. Accordingly, the present lubricating device is not required to increase the above-indicated strength of bonding, assuring an outstanding advantage that the resin piping assembly can be manufactured with reduced size and weight. Further, the lubricating device is configured such that the interfacial surfaces are bonded together by welding, so that the resin piping assembly can be more easily manufactured than where those interfacial surfaces are bonded together with an adhesive agent, since the bonding by welding does not require the use of an adhesive agent, and coating of the interfacial surfaces with the adhesive agent.

DETAILED DESCRIPTION OF PREFERRED EMBODIMENTS

Figure 1:
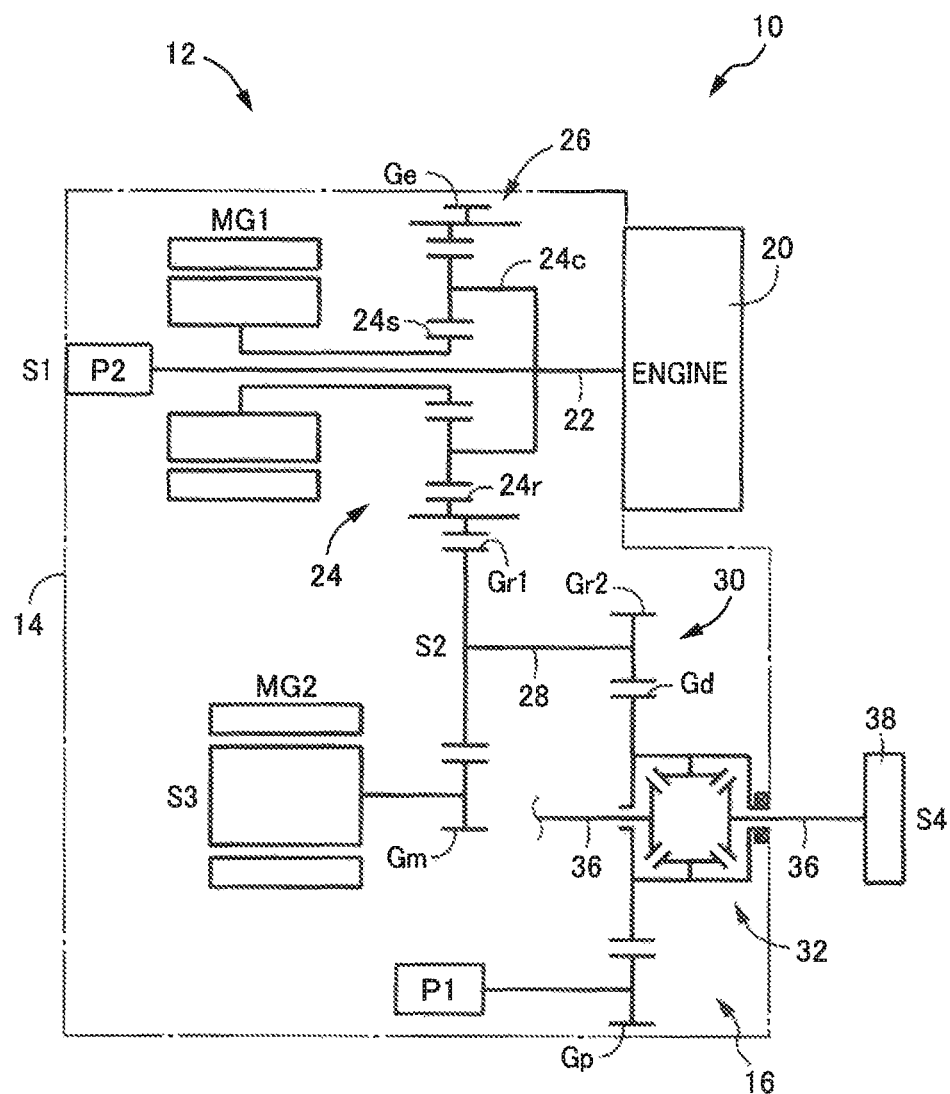
FIG. 1 is a schematic view showing an arrangement of a power transmitting system of a hybrid vehicle, which is provided with a lubricating device according to one embodiment of this invention.

The lubricating device according to the present invention is suitably applicable to a power transmitting system of a vehicle, for delivering the lubricant oil to predetermined lubricated portions of the power transmitting system. However, the present lubricating device is equally applicable to a power transmitting system other than the vehicular power transmitting system. Examples of the lubricated portions of the power transmitting system include: power transmitting gears meshing with each other; a transmission belt; bearings rotatably supporting rotary shafts of the power transmitting system; and mutually frictionally contacting portions and heat generating portions of electric motors and generators of hybrid or electric vehicles, which are required to be lubricated or cooled during power transmission. The resin piping assembly of the lubricating device according to the present invention may be used to deliver the lubricant oil from the oil pump directly to the predetermined lubricated portions, but may be used to deliver the lubricant oil to any other portions or for any other purposes, for instance, to deliver the lubricant oil to an oil cooler or any other heat exchanging device, or to valve bodies, or to deliver the lubricant oil from the heat exchanging device or the valve bodies to the lubricated portions.

For instance, a pair of divisional components of the resin piping assembly are bonded together at their interfacial surfaces, and cooperate to define the oil passage. In this case, at least one of the interfacial surfaces of the two divisional components has a groove (elongate recess) which at least partially defines the oil passage. The two divisional components need not constitute respective two halves of the resin piping assembly, that is, need not have respective two symmetrical semi-circular shapes in cross section in a plane perpendicular to the direction of flow of the lubricant oil through the oil passage. Namely, the two divisional components may have respective different arcuate dimensions in the above-indicated cross section. For instance, the arcuate dimensions of the two divisional components may have a ratio of 1:2 or 1:3. It is possible that one of the interfacial surfaces of the two divisional components may have no groove, while the other interfacial surface has a groove having a semi-circular, U or V shape in the above-indicated cross section. The cross sectional shape of the groove may be a circular, elliptical, triangular, quadrangular or any other polygonal shape. The plurality of divisional components are desirably bonded together in a welding process in which the divisional components are pressed against each other and bonded to each other, while a synthetic resin material of the divisional components is melted by friction or heating. For example, the divisional components are preferably bonded together in a vibration welding process in which the divisional components are subjected to vibration and welding due to friction heat generated by the vibration, while the divisional components are pressed against each other. However, the divisional components may be bonded together while they are pressed against each other during their vibration after their interfacial surfaces are heated by exposure to infrared rays. The divisional components may be bonded together with an adhesive agent, rather than by welding. The strength of bonding with the adhesive agent depends upon the areas of the interfacial surfaces of the divisional components. In this respect, the present invention has an advantage.

While the resin piping assembly is basically formed of a synthetic resin, reinforcing metallic members may be embedded in the resin piping assembly, by an insert-molding process. For example, the resin piping assembly includes a plurality of divisional components including: (a) a base divisional component consisting of a first half component and a second half component which have respective interfacial surfaces; (b) a first divisional component which is bonded to the first half component, with an interfacial surface of the first divisional component being held in contact with the interfacial surface of the first half component, and which cooperates with the first half component to define a first passage portion of the oil passage; and (c) a second divisional component which is bonded to the second half component, with an interfacial surface of the second divisional component being held in contact with the interfacial surface of the second half component, and which cooperates with the second half component to define a second passage portion of the oil passage. The base divisional component is provided with a cylindrical connecting portion having a connecting passage portion as a part of the oil passage, for communication between the first and second passage portions. However, the resin piping assembly may consist of the base divisional component and at least one of the other divisional components, and may consist of four or more divisional components including the base divisional component.

For example, the base divisional component is provided with two fixing portions such that the two fixing portions are spaced apart from each other along a length of the oil passage. The two fixing portions are fixed to the structural member of the power transmitting system, at respective two positions. However, the base divisional component may be provided with three or more fixing portions to be fixed to the structural member of the power transmitting system, at respective three or more positions. For example, the fixing portions are fixed to the structural member with bolts or any other fastening members. However, the fixing portions may be fixed to the structural member by various other methods such as calking or fitting engagement to or with the structural member. Although the fixing portions are preferably formed integrally with the base divisional component while the base divisional component is formed by an injection molding process, for example, the fixing portions may be formed separately from the base divisional component, and fixed to the base divisional component by screws or any other fastening members. Alternatively, metallic fixing portions may be formed integrally with the base divisional component by an insert-molding process. Each of the plurality of divisional components including the base divisional component is preferably formed as a one-piece body by injection molding or pressing. However, each divisional component may be formed by a machining operation or any other various forming method.

To supply the lubricant oil delivered from the oil pump to the predetermined lubricated portions through the resin piping assembly, it is desirable that at least one of the plurality of fixing portions provided on the base divisional component is fixed to the oil pump, and that the connecting portion connected to the oil pump is provided on the base divisional component. However, all of the plurality of fixing portions may be fixed to the structural member other than the oil pump, and the connecting portion connected to the oil pump may be provided on the divisional component other than the base divisional component. While the connecting portion is desirably a linearly extending cylindrical connector port, the connecting portion may be a connector fitting connected to a delivery port of the oil pump. The connector port is preferably formed integrally with the base divisional component while the base divisional component is formed by an injection molding process, for example. However, the connector port may be formed separately from the base divisional component, and fixed to the base divisional component by screws or any other fastening members. Alternatively, a metallic connector port may be formed integrally with the divisional component by an insert-molding process. Where the connecting portion is connected to a member other than the oil pump, such as a valve body or a heat exchanger, this connecting portion may have the same arrangement as the connecting portion to be fixed to the oil pump. Further, a plurality of connecting portions may be provided on at least one of the plurality of divisional components including the base divisional component.

At least one of the divisional components including the base divisional component is provided with the hollow nozzle portions having the respective delivery nozzles from which the lubricant oil is ejected. However, the hollow nozzle portions need not be provided, provided that delivery nozzles held in communication with the oil passage defined by and between the plurality of divisional components are formed in communication with an outside atmosphere outside the resin piping assembly, so that the lubricant oil is ejected from those delivery nozzles. Alternatively, the lubricant oil may be delivered from the resin piping assembly to the valve body, heat exchanger or any other device, through a connecting portion such as a connector fitting or a connector port, or the lubricant oil may be supplied from such device into the resin piping assembly. For instance, each of the delivery nozzles and the connector fitting may be formed by a molding process to form the divisional component, with a movement of a slidable mold which is incorporated within a movable mold and which is mechanically movable by a cam, in synchronization with the movement of the movable mold. However, the delivery nozzle and the connector fitting may be formed by a machining operation, for example, after the molding process to form the divisional component.

The base divisional component preferably has the length of the inner wall surface in the cross section taken in the plane perpendicular to the direction of flow of the lubricant oil through the oil passage, which is larger than that of any other of the plurality of divisional components. However, the length of the inner wall surface of the base divisional component may be substantially equal or smaller than that of any other of the plurality of divisional components.

Embodiments

Preferred embodiments of the present invention will be described in detail by reference to the drawings. It is to be understood that the drawings are simplified and transformed as needed, and do not necessarily accurately represent dimensions and shapes of various elements of the embodiment.

Reference is first made to FIG. 1, which is the schematic view showing an arrangement of a hybrid vehicle 10 including a transaxle 12 provided with a lubricating device 40 (described below by reference to FIG. 2) according to a first embodiment of this invention. The transaxle 12 includes a power transmitting mechanism 16 having a plurality of axes which are shown in a common plane of the view of FIG. 1. The transaxle 12 is configured to transmit an output of a drive power source in the form of an engine 20 to left and right drive wheels 38, and is of a transversely mounted type installed on the hybrid vehicle 10 of an FF type, for example, such that the plurality of axes of the power transmitting mechanism 16 of a gear type are parallel to a width or transverse direction of the hybrid vehicle 10. The power transmitting mechanism 16 is accommodated within a casing 14. The engine 20 is an internal combustion engine such as a gasoline or diesel engine, which generates a vehicle drive force by combustion of a fuel. The transaxle 12 is a power transmitting system, and the casing 14 consists of a plurality of members as needed.

The power transmitting mechanism 16 has first through fourth axes S1-S4 substantially parallel to the width direction of the hybrid vehicle 10. On the first axis S1, there are disposed: an input shaft 22 connected to the engine 20 functioning as the drive power source; a planetary gear set 24 of a single-pinion type; and a first motor/generator MG1. The planetary gear set 24 and the first motor/generator MG1 function as an electrically controlled differential portion 26. The planetary gear set 24 functions as a differential mechanism, and includes a carrier 24c connected to the input shaft 22, a sun gear 24s connected to the first motor/generator MG1, and a ring gear 24r provided with an engine output gear Ge. The carrier 24c, sun gear 24s and ring gear 24r respectively correspond to first, second and third rotary elements, while the first motor/generator MG1 corresponds to a differential control motor. The first motor/generator MG1 is operated selectively as an electric motor or an electric generator. When the first motor/generator MG1 is operated as the electric generator, a rotating speed of the sun gear 24s is continuously controlled by a regenerative control of the first motor/generator MG1, so that an operating speed of the engine 20 is continuously varied, and a rotary motion of the engine 20 is output from the engine output gear Ge. When the sun gear 24s is placed in a freely rotatable state with torque of the first motor/generator MG1 being zeroed, the engine 20 and the power transmitting mechanism 16 are disconnected from each other, so that dragging of the engine 20 by the power transmitting mechanism 16 is prevented.

On the second axis S2, there is disposed a speed reducing gear device 30 including a shaft 28 provided at opposite axial ends of the shaft 28 with a large-diameter speed reducing gear Gr1 and a small-diameter speed reducing gear Gr2. The large-diameter speed reducing gear Gr1 is held in meshing engagement with the engine output gear Ge, and a motor output gear Gm of a second motor/generator MG2 disposed on the third axis S3. The second motor/generator MG2 is operated selectively as an electric motor or an electric generator. The second motor/generator MG2 serves as a drive power source for driving the hybrid vehicle 10 when the second motor/generator MG2 is operated as the electric motor. Thus, the second motor/generator MG2 is operable as a vehicle driving electric motor.

The small-diameter speed reducing gear Gr2 is held in meshing engagement with a differential ring gear Gd of a differential gear device 32 disposed on the fourth axis S4, so that drive forces of the engine 20 and the second motor/generator MG2 are distributed to left and right drive shafts 36 through the differential gear device 32, and transmitted to the left and right drive wheels 38. The engine output gear Ge, the large-diameter speed reducing gear Gr1, the small-diameter speed reducing gear Gr2 and the differential ring gear Gd primarily constitute a gear mechanism. The fourth axis S4 of the first through fourth axes S1-S4 is the axis located at the lowest position in the hybrid vehicle 10, and a bottom portion of the casing 14 serves as an oil reservoir 46 storing a lubricant oil 48, as shown in FIG. 2, so that a lower portion of the differential gear device 32 is immersed in a bath of the lubricant oil 48.

The hybrid vehicle 10 constructed as described above is placed in a selected one of an EV (electric vehicle) drive mode and an HV (hybrid vehicle) drive mode, according to a drive mode switching map and on the basis of a required vehicle drive force (as represented by an operation amount of an accelerator pedal) and a running speed V of the hybrid vehicle 10, for example. In the EV drive mode, the hybrid vehicle 10 is driven with the second motor/generator MG2 operated as the drive power source, while the engine 20 is held at rest. This EV drive mode is selected when the required vehicle drive force is comparatively small, namely, the hybrid vehicle 10 is in a low-load running state. In the EV drive mode, a fuel supply to the engine 20 is stopped, and the torque of the first motor/generator MG1 is zeroed, so that the sun gear 24s of the planetary gear set 24 is freely rotatable, and the first motor/generator MG1 is held substantially at rest, even in a running state of the hybrid vehicle 10. In the HV drive mode, the hybrid vehicle 10 is driven with the engine 20 operated as the drive power source, while a regenerative operation of the first motor/generator MG1 is controlled. The HV drive mode is selected when the required vehicle drive force is comparatively large, namely, the hybrid vehicle 10 is in a high-load running state. In this HV drive mode, the second motor/generator MG2 is operated as the drive power source when generation of an assisting torque is required to accelerate the hybrid vehicle 10, for example, or is kept operated as the drive power source.

The hybrid vehicle 10 may be placed in an engine drive mode in place of the above-described HV drive mode, or as well as in the HV drive mode. In the engine drive mode, only the engine 20 is operated as the drive power source. Although the arrangement of the transaxle 12 of the hybrid vehicle 10 has been described for illustrative purpose only, the transaxle 12 may be constructed with various changes or modifications. For example, the planetary gear set 24 of the single-pinion type may be replaced by a planetary gear set of a double-pinion type, or a plurality of planetary gear sets. Further, the second motor/generator MG2 may be disposed on the first axis S1, and the electrically controlled differential portion 26 may be replaced by a mechanically operated transmission.

Figure 2:
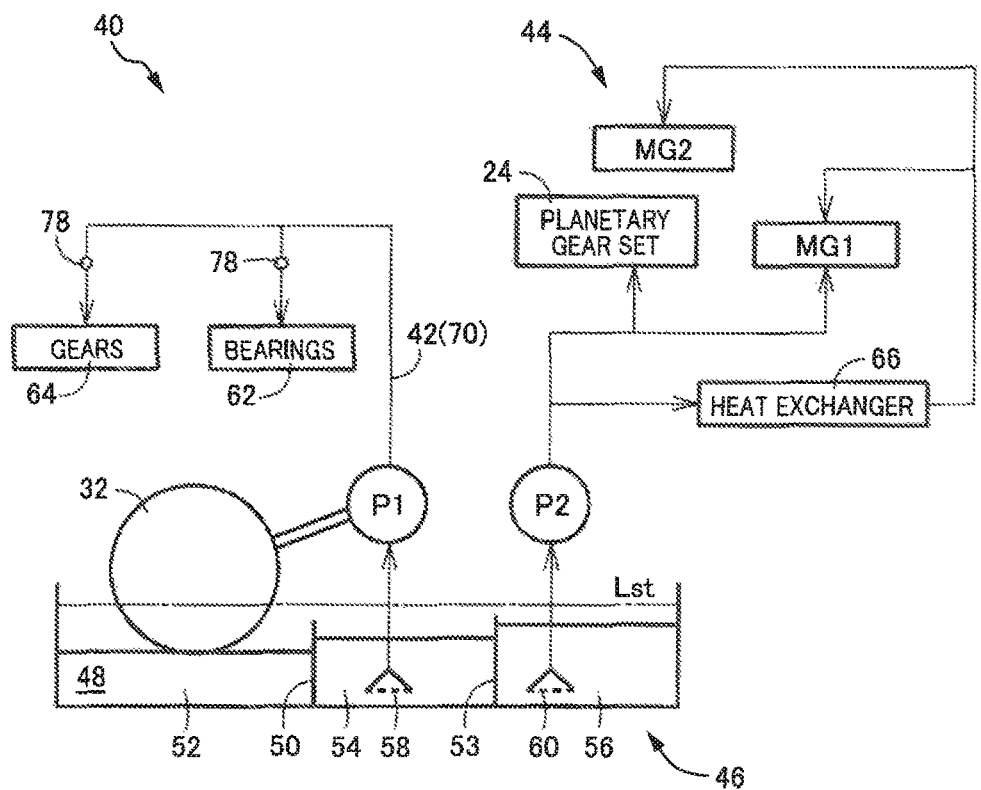
FIG. 2 is a hydraulic circuit diagram illustrating the lubricating device of the power transmitting system shown in FIG. 1.

In the present embodiment of the invention, the transaxle 12 of the hybrid vehicle 10 is provided with the above-indicated lubricating device 40 shown in FIG. 2. The lubricating device 40 includes a first oil pump P1 and a second oil pump P2 as an oil pumping device. The first and second oil pumps P1 and P2 are connected to respective first and second oil supply passages 42 and 44 which are independent of each other, and which are assigned to respective groups of predetermined lubricated portions of the power transmitting mechanism 16. As shown in FIG. 1, the first oil pump P1 is a mechanical pump mechanically operated by a pump driving gear Gp held in meshing engagement with the differential ring gear Gd, while the second oil pump P2 is a mechanical pump mechanically operated by the engine 20 through the input shaft 22. The first oil pump P1 may be modified such that the pump driving gear Gp is held in meshing engagement with the large-diameter speed reducing gear Gr1 or the small-diameter speed reducing gear Gr2, which is rotated in synchronization with the differential ring gear Gd. The second oil pump P2 is an oil pump operated by a drive power source different from a vehicle drive force output portion in the form of the differential gear device 32, that is, an oil pump operated by the engine 20. However, the second oil pump P2 may be replaced by an electrically operated oil pump operated by an exclusive pump driving electric motor.

The first and second oil pumps P1 and P2 described above are configured to suck the lubricant oil 48 from the oil reservoir 46 located in the bottom portion of the casing 14, and to deliver the lubricant oil 48 through the first and second oil supply passages 42 and 44. A space formed within the oil reservoir 46, which is constituted by the bottom portion of the casing 14, is divided by a first partition wall 50 into a rear portion as seen in a longitudinal direction of the hybrid vehicle 10, and the other portion. This rear portion of the space serves as a first oil reservoir portion 52 located below the differential gear device 32. The above-indicated other portion of the space is divided by a second partition wall 53 into two parts located adjacent to each other in the longitudinal direction of the hybrid vehicle 10, namely, a second oil reservoir portion 54 located adjacent to the first oil reservoir portion 52, and a third oil reservoir portion 56 located adjacent to the second oil reservoir portion 54. A suction port 58 of the first oil pump P1 is disposed within the second oil reservoir portion 54, while a suction port 60 of the second oil pump P2 is disposed within the third oil reservoir portion 56. These two suction ports 58 and 60 are connected to the respective first and second oil pumps P1 and P2 through respective suction passages.

The first and second partition walls 50 and 53 function as an oil-flow restricting portion which allows but restricts flows of the lubricant oil 48 between the first and second oil reservoir portions 52 and 54, and between the second and third oil reservoir portions 54 and 56, such that baths of the lubricant oil 48 in the first, second and third oil reservoir portions 52, 54 and 56 have different levels, when the first and second oil pumps P1 and P2 are operated. Namely, when the first and second oil pumps P1 and P2 are both held at rest while the hybrid vehicle 10 is stationary, the baths of the lubricant oil 48 in all of the three oil reservoir portions 52, 54 and 56 have the same level, that is, a static level Lst indicated by a one-dot chain line in FIG. 2, which level Lst is higher than upper ends of the first and second partition walls 50 and 53, since the oil 48 delivered to the various lubricated portions of the transaxle 12 drops down into the oil reservoir 46 while the oil pumps P1 and P2 are held at rest. When the oil pumps P1 and P2 are operated during running of the hybrid vehicle 10, however, the oil 48 is delivered from the oil pumps P1 and P2 to the various lubricated portions of the transaxle 12, so that a volume of the lubricant oil 48 staying in the oil reservoir 46 is reduced, whereby the levels of the baths of the lubricant oil 48 in the oil reservoir portions 52, 54 and 56 are lowered below the upper ends of the partition walls 50 and 53, and to respective different heights indicated by solid lines in FIG. 2, due to the flow restricting function of the partition walls 50 and 53.

The upper ends of the first and second partition walls 50 and 53 are higher than the lower end of the differential gear device 32, so that a lower portion of the differential gear device 32 is immersed in the bath of the lubricant oil 48 in the first oil reservoir portion 52 while the level of the lubricant oil 48 in the oil reservoir 46 is higher than the upper ends of the partition walls 50 and 53 in the stationary state of the hybrid vehicle 10. When the hybrid vehicle 10 is started in this stationary state in which the differential gear device 32 is partially immersed in the bath of the lubricant oil 48 in the first oil reservoir portion 52, the lubricant oil 48 is splashed up by the differential ring gear Gd, and is scattered over the lubricated portions of the transaxle 12, so that these lubricated portions can be sufficiently lubricated during starting of the hybrid vehicle 10 wherein the first oil pump P1 has difficulty to deliver a sufficient amount of the lubricant oil 48.

While the oil pumps P1 and P2 are operated during running of the hybrid vehicle 10, on the other hand, the level of the lubricant oil 48 is lowered below the upper ends of the partition walls 50 and 53 as a result of splashing of the lubricant oil 48 by the differential ring gear Gd rotated according to the running speed V of the hybrid vehicle 10, and suction of the lubricant oil 48 by the oil pumps P1 and P2. The level of the bath of the lubricant oil 48 in the first oil reservoir portion 52 is determined by a difference between the amount of the lubricant oil 48 splashed up by the differential ring gear Gd and the amount of the lubricant oil 48 returned back into the first oil reservoir portion 52, and the level of the bath of the lubricant oil 48 in the second oil reservoir portion 54 is determined by a difference between the amount of the lubricant oil 48 sucked by the first oil pump P1 and the amount of the lubricant oil 48 returned back into the second oil reservoir portion 54, while the level of the bath of the lubricant oil 48 in the third oil reservoir portion 56 is determined by a difference between the amount of the lubricant oil 48 sucked by the second oil pump P2 and the amount of the lubricant oil 48 returned back into the third oil reservoir portion 56. In the present embodiment, the volume of the first oil reservoir portion 52 is determined, namely, the position and shape of the first partition wall 50 are determined such that the level of the bath of the lubricant oil 48 in the first oil reservoir portion 52 can be lowered to a lowest position, so that agitation of the lubricant oil 48 by the rotary motion of the differential gear device 32 is restricted to reduce a power loss due to the agitation. Further, the levels of the baths of the lubricant oil 48 in the second and third oil reservoir portions 54 and 56 in which the suction ports 58 and 60 are disposed are made higher than the level in the first oil reservoir portion 52, so that it is possible to reduce a risk of air suction by the oil pumps P1 and P2 due to exposure of the suction ports 58 and 60 above the levels of the baths of the lubricant oil 48 in the second and third oil reservoir portions 54 and 56, whereby the lubricant oil 48 can be adequately sucked by the oil pumps P1 and P2, and stably delivered to the predetermined lubricated portions of the transaxle 12.

In addition, the second and third oil reservoir portions 54 and 56 which are separated from each other by the second partition wall 53 in the longitudinal direction of the hybrid vehicle 10 have comparatively small dimensions in the longitudinal direction, making it possible to reduce an amount of variation, in the longitudinal direction, of a distance from the bottoms of the oil reservoir portions 54 and 56 to the oil levels of the baths of the lubricant oil 48 therein, which variation takes place due to a change of attitude of the hybrid vehicle 10 according to a gradient of the roadway surface, or acceleration or deceleration of the hybrid vehicle 10, whereby it is possible to more effectively reduce the risk of air suction by the oil pumps P1 and P2 the suction ports 58 and 60 of which are disposed in the oil reservoir portions 54 and 56. In this respect, it is noted that the first and second partition walls 50 and 53 may have the same height dimension, and that the first and second partition walls 50 and 53 need not be provided.

The first oil pump P1 is operatively connected to and operated by the vehicle drive force output portion in the form of the differential gear device 32, and the first oil supply passage 42 connected to a delivery port of the first oil pump P1 is provided to delivery the lubricant oil 48 to the lubricated portions of the power transmitting mechanism 16. The lubricated portions include bearings 62 and gears 64 (Ge, Gr1, Gr2, Gd, Gm, Gp) incorporated in the power transmitting mechanism 16. The first oil pump P1 is operatively connected to and operated by the differential gear device 32, and is therefore operated even in the EV drive mode in which the engine 20 is held at rest, so that the first oil pump P1 is able to suck the lubricant oil 48 by an amount according to the vehicle running speed V, and to deliver the lubricant oil 48 to the lubricated portions. That is, the vehicle running speed V corresponds to an operating speed of the first oil pump P1, and to a volume of the lubricant oil 48 delivered from the first oil pump P1. Although the differential gear device 32 is lubricated with the lubricant oil 48 splashed up by the differential ring gear Gd, the differential gear device 32 may be lubricated with the lubricant oil 48 delivered through the first oil supply passage 42. Further, an oil storage may be provided as needed to ensure a stable supply of the lubricant oil 48 to the first oil pump P1, for preventing a risk of air suction by the first oil pump P1.

The second oil supply passage 44 is connected to a delivery port of the second oil pump P2, to delivery the lubricant oil 48 to the predetermined lubricated portions located upwardly of the second and third oil reservoir portions 54 and 56. These lubricated portions include: the input shaft 22; the planetary gear set 24; and the first motor/generator MG1. The second oil supply passage 42 is provided with a heat exchanger 66 to cool the lubricant oil 48, so that the cooled lubricant oil 48 is delivered to the first motor/generator MG1 and the second motor/generator MG2, for cooling and preventing overheating of the motor/generator MG1 and the motor/generator MG2. For example, the heat exchanger 66 is an oil cooler of an air cooling or water cooling type for cooling the lubricant oil 48. Since the engine 20 used to operate the second oil pump P2 can be operated even while the hybrid vehicle 10 is stationary, an adequate amount of the lubricant oil 48 can be sucked by and delivered to the lubricated portions from the second oil pump P2, irrespective of a variation of the vehicle running speed V, even while the hybrid vehicle 10 is stationary. It is noted that the second oil pump P2 may be dispensed with, provided the first oil pump P1 is adapted to deliver the lubricant oil 48 also to the motor/generator MG1 and motor/generator MG2, and the planetary gear set 24.

Figure 3:
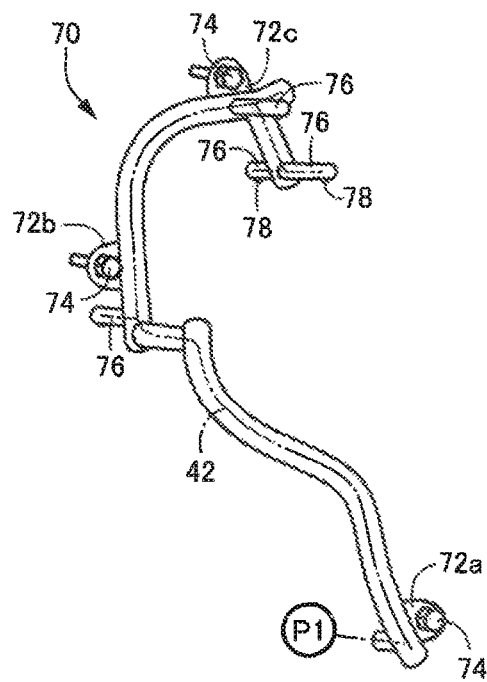
FIG. 3 is a schematic perspective view showing an oil piping assembly which provides a first oil supply passage of the lubricating device shown in FIG. 2.

FIG. 3 is the schematic perspective view showing an oil piping assembly 70 having the first oil supply passage 42 of the lubricating device 40 shown in FIG. 2. The oil piping assembly 70 is formed separately from the casing 14, and is provided with a plurality of fixing portions 72a, 72b and 72c (hereinafter referred to simply as "fixing portions 72", unless otherwise specified), which are to be fixed to an inner wall surface of the casing 14 or to an outer surface of a housing of the first oil pump P1, with fastening members 74 such as bolts, such that the oil piping assembly 70 is located at a predetermined position within the casing 14. The plurality of fixing portions 72a, 72b and 72c are spaced apart from each other in a longitudinal direction of the oil piping assembly 70, namely, along a length of the first oil supply passage 42 formed through the oil piping assembly 70. As shown in the schematic view of FIG. 8, the lowest fixing portion 72a is fixed to the outer surface of the housing of the first oil pump P1, and the intermediate and uppermost fixing portions 72b and 72c are fixed to the inner wall surface of the casing 14. The casing 14 and the first oil pump P1 to which the oil piping assembly 70 is fixed are structural members disposed at predetermined positions in the transaxle 12. The first oil pump P1 is fixed to the casing 14 with bolts or other fixing means. The oil piping assembly 70 has a plurality of hollow nozzle portions 76 from which the lubricant oil 48 is ejected toward the lubricated portions, that is, to the bearings 62 and the gears 64. The oil piping assembly 70 has a three-dimensionally bent generally hollow structure. The oil piping assembly 70 is a resin piping assembly formed of a synthetic resin material so as to define an oil passage in the form of the first oil supply passage 42 through which the lubricant oil 48 flows.

Figure 4:
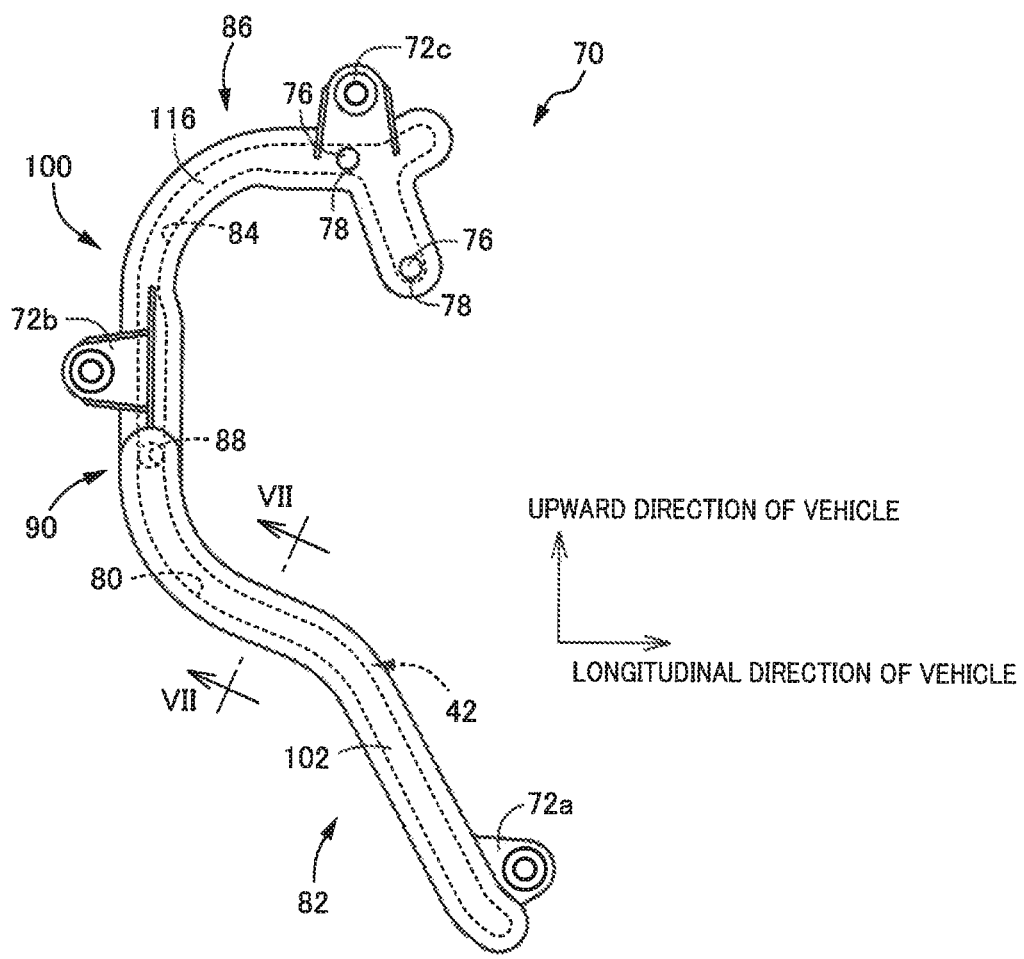
FIG. 4 is a front elevational view of the oil piping assembly of FIG. 3 as seen in a width or transverse direction of the hybrid vehicle.
Figure 5:
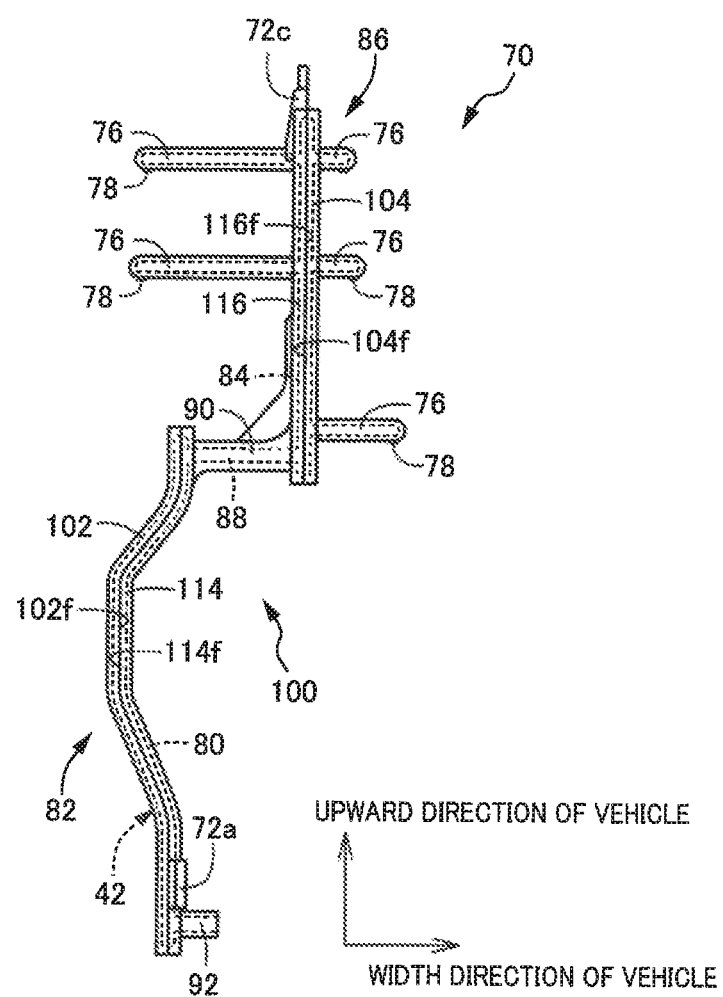
FIG. 5 is a side elevational view of the oil piping assembly as seen in the leftward direction of FIG. 4.

FIG. 4 is the front elevational view of the oil piping assembly 70 of FIG. 3 as seen in the width or transverse direction of the hybrid vehicle 10, and FIG. 5 is the side elevational view of the oil piping assembly 70 as seen in the leftward direction of FIG. 4. The oil piping assembly 70 is a three-dimensional structure, and the first oil supply passage 42 is accordingly a three-dimensional passage indicated by broken lines in FIG. 5. Described more specifically, the oil piping assembly 70 includes a first pipe portion 82 having a first passage portion 80, a second pipe portion 86 having a second passage portion 84, and a connecting pipe portion 90 having a connecting passage portion 88 for communication between the ends of the first and second passage portions 80 and 84. The first oil supply passage 42 consists of the first passage portion 80, the connecting passage portion 88 and the second passage portion 84. The second pipe portion 86 having the second passage portion 84 has a two-dimensional structure lying in a substantially vertical two-dimensional plane defined by a vertical direction and the longitudinal direction of the hybrid vehicle 10. The first pipe portion 82 having the first passage portion 80 has a three-dimensional structure including a curved intermediate part which protrudes from a two-dimensional plane parallel to the two-dimensional plane of the second pipe portion 86, in the width or transverse direction of the hybrid vehicle 10. The connecting pipe portion 90 having the connecting passage portion 88 extends substantially linearly in the width direction of the hybrid vehicle 10 and in a substantially horizontal direction, and is connected to the first and second pipe portions 82 and 86, so as to intersect at right angles these pipe portions 82 and 86 respectively. As shown in FIG. 4, the first and second pipe portions 82 and 86 extend from the connecting pipe portion 90 in the respective opposite vertical directions (downward and upward directions). The plurality of hollow nozzle portions 76 of the second pipe portion 86 extend linearly in the horizontal direction (width direction of the hybrid vehicle 10) parallel with the connecting pipe portion 90, and have respective delivery nozzles 78 formed at their end parts such that the delivery nozzles 78 are open externally of the nozzle portions 76, more specifically, open downwards in the present embodiment. The first pipe portion 82 has a cylindrical connector port 92 formed at its end part remote from the connecting pipe portion 90 such that the connector port 92 extends linearly in the horizontal direction (width direction of the hybrid vehicle 10) parallel with the connecting pipe portion 90. The connector port 92 corresponds to a connecting portion which is connected to the first oil pump P1 and through which the lubricant oil 48 flows from the first oil pump P1 into the first oil supply passage 42 formed through the oil piping assembly 70.

Figure 6:
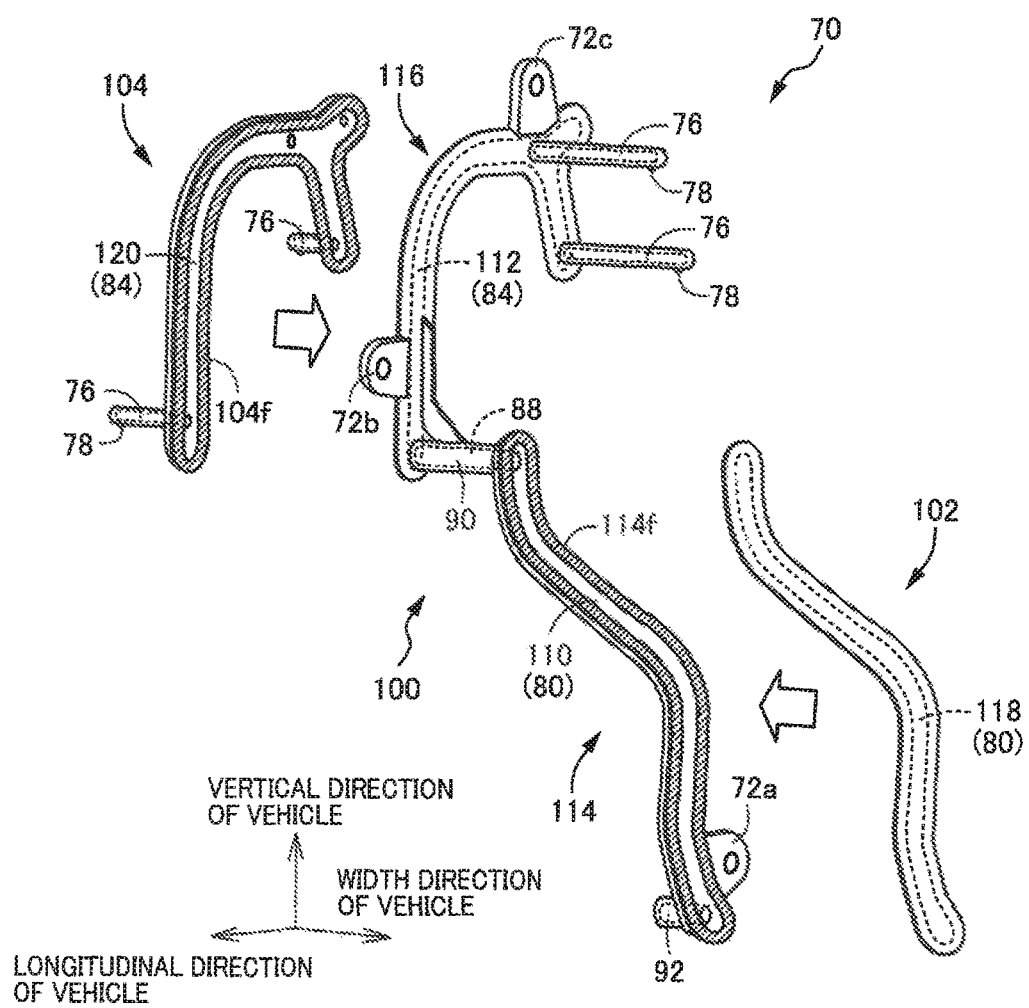
FIG. 6 is a perspective view of three divisional components of the oil piping assembly before the divisional components are bonded together to form the oil piping assembly.
Figure 8:
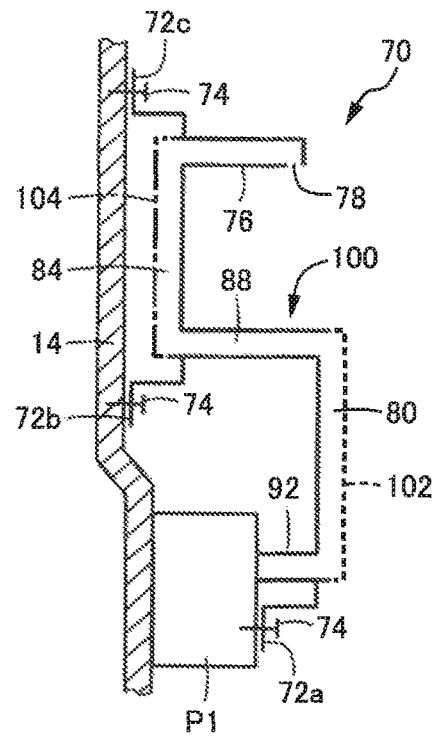
FIG. 8 is a schematic view for explaining a structure for fixing the oil piping assembly of FIG. 3.

The oil piping assembly 70 includes a plurality of divisional components corresponding two of which cooperate to define a circumference of the first oil supply passage 42 along a length of the first oil supply passage 42. Each divisional component is made of resin material. As shown in FIG. 6, the oil piping assembly 70 according to the present embodiment consists of three divisional components, that is, a base divisional component 100, a first divisional component 102 and a second divisional component 104. In FIG. 8, a solid line represents the base divisional component 100, and a broken line represents the first divisional component 102, while a one-dot chain line represents the second divisional component 104. The base divisional component 100 consists of a pair of half components, that is, a first half component 114 and a second half component 116 which have respective first and second A-grooves 110 and 112 which are open in respective opposite directions. The first and second half components 114 and 116 also have respective interfacial surfaces 114f and 116f. The first A-groove 110 is open in the direction of the interfacial surface 114f, i.e., the normal direction of the interfacial surface 114f or a direction perpendicular to the interfacial surface 114f, namely, open in the leftward direction as seen in FIG. 5, and the second A-groove 112 is open in the direction perpendicular to the interfacial surface 116f, namely, open in the rightward direction as seen in FIG. 5. That is, the first and second A-grooves 110 and 112 are open in the respective opposite directions parallel to the width direction of the hybrid vehicle 10, and the first and second half components 114 and 116 are offset or spaced apart from each other in the width direction of the hybrid vehicle 10. Described more specifically, the first half component 114 is offset or spaced apart from the second half component 116 in the rightward direction parallel to the width direction of the hybrid vehicle 10, as seen in FIG. 6, while the second A-groove 112 formed in the second half component 116 is open in the leftward direction. The first and second half components 114 and 116 are connected to each other at their respective upper and lower end portions, by the connecting pipe portion 90 extending in the width direction of the hybrid vehicle 10, such that the first and second half components 114 and 116 extend from the connecting pipe portion 90 in the respective vertically opposite directions, that is, in the downward and upward directions. The connecting passage portion 88 formed through the connecting pipe portion 90 is open in bottom walls of the first and second A-grooves 110 and 112. Hatching lines in FIG. 6 around the first A-groove 110 represent the interfacial surface 114f, for easier recognition of the interfacial surface 114f.

The above-indicated connector port 92 extends integrally from the lower end portion of the first half component 114, linearly parallel with the connecting pipe portion 90, in the direction opposite to the direction in which the first A-groove 110 is open, while the nozzle portions 76 extend integrally from the second half component 116, linearly parallel with the connecting pipe portion 90, in the direction opposite to the direction in which the second A-groove 112 is open. Further, the fixing portion 72*a* extends integrally from the lower end portion of the first half component 114, in a direction substantially parallel to the interfacial surface 114*f*, and the fixing portion 72*b* extends integrally from a portion adjacent to the lower end portion of the second half component 116, in a direction substantially parallel to the interfacial surface 116*f*, while the fixing portion 72*c* extends integrally from the upper end portion of the second half component 116, in the direction substantially parallel to the interfacial surface 116*f*.

For instance, the base divisional component 100 constructed as described above is formed by an injection molding process, together with the connecting pipe portion 90 having the connecting passage portion 88, the hollow nozzle portions 76, the cylindrical connector port 92, the first and second A-grooves 110 and 112 and the fixing portions 72, by using an injecting molding device provided with a pair of forming molds, that is, a stationary mold and a movable mold which are movable toward and away from each other in the direction parallel to the connecting pipe portion 90, the nozzle portions 76 and the connector port 92. The thus formed base divisional component 100 may be subjected to a machining operation for its intricate shaping adjustment, as needed. For instance, the connecting pipe portion 90 may be subjected to a machining operation on its outer circumferential surface, to remove unnecessary stock or burrs. For instance, each of the delivery nozzles 78 of the nozzle portions 76 may be formed by the injection molding process to form the base divisional component 100, with a movement of a slidable mold which is incorporated within the movable mold and which is movable by a cam, in the direction perpendicular to the above-indicated direction of movement of the movable mold, in synchronization of the movement of the movable mold. However, the delivery nozzles 78 may be formed by a machining operation, for example, after the injection molding process. While the fixing portions 72 are formed integrally with the base divisional component 100 by the injection molding process, annular reinforcing metallic plates are embedded in the fixing portions 72 as needed, by an insert-molding process.

The first divisional component 102 has a first B-groove 118 and cooperates with the first half component 114 of the base divisional component 100, to define therebetween the first passage portion 80. The first divisional component 102 has an interfacial surface 102*f* around an opening of the first B-groove 118. The first divisional component 102 is bonded to the first half component 114 such that the interfacial surface 102*f* is held in abutting contact with the interfacial surface 114*f* around an opening of the first A-groove 110. Thus, the first passage portion 80 is defined by the first A-groove 110 and the first B-groove 118. The first B-groove 118 is open in the direction perpendicular to the interfacial surface 102*f* of the first divisional component 102, namely, open in the rightward direction as seen in FIG. 5, so that the interfacial surface 114*f* of the first half component 114 and the interfacial surface 102*f* of the first divisional component 102 are fluid-tightly abuttable with each other. The interfacial surface 114*f* have recesses and protrusions for fluid-tight contact with respective protrusions and recesses of the interfacial surface 102*f*.

For instance, the thus formed first divisional component 102 is formed with the first B-groove 118, by an injection molding process, by using an injecting molding device provided with a pair of forming molds, that is, a stationary mold and a movable mold which are movable toward and away from each other in the direction perpendicular to the interfacial surface 102*f*, namely, in the direction in which the first B-groove 118 is open. The thus formed first divisional component 102 may be subjected to a machining operation for its intricate shaping adjustment, as needed.

The second divisional component 104 has a second B-groove 120 and cooperates with the second half component 116 of the base divisional component 100, to define therebetween the second passage portion 84. The second divisional component 104 has an interfacial surface 104*f* around an opening of the second B-groove 120. The second divisional component 104 is bonded to the second half component 116 such that the interfacial surface 104*f* is held in abutting contact with the interfacial surface 116*f* around an opening of the second A-groove 112. Thus, the second passage portion 84 is defined by the second A-groove 112 and the second B-groove 120. The second B-groove 120 is open in the direction perpendicular to the interfacial surface 104*f* of the second divisional component 104, namely, open in the leftward direction as seen in FIG. 5, so that the interfacial surface 116*f* of the second half component 116 and the interfacial surface 104*f* of the second divisional component 104 are fluid-tightly abuttable with each other. The interfacial surface 116*f* have recesses and protrusions for fluid-tight contact with respective protrusions and recesses of the interfacial surface 104*f*. As shown in FIG. 5, the second divisional component 104 has the plurality of integrally formed hollow nozzle portions 76 linearly extending in the width direction of the hybrid vehicle 10, more specifically, in the direction opposite to the direction in which the second B-groove 120 is open. Hatching lines in FIG. 6 around the second B-groove 120 represent the interfacial surface 104*f*, for easier recognition of the interfacial surface 104*f*.

For instance, the thus formed second divisional component 104 is formed with the hollow nozzle portions 76 and the second B-groove 120, by an injection molding process, by using an injecting molding device provided with a pair of forming molds, that is, a stationary mold and a movable mold which are movable toward and away from each other in the direction parallel to the nozzle portions 76. The thus formed second divisional component 104 may be subjected to a machining operation for its intricate shaping adjustment, as needed. The delivery nozzles 78 of the nozzle portions 76 may be formed by the injection molding process to form the second divisional component 104, with movements of slidable dies which are incorporated within the movable mold and which are movable by cams, for instance, in the direction perpendicular to the above-indicated direction of movement of the movable mold, in synchronization of the movement of the movable mold. However, the delivery nozzles 78 may be formed by a machining operation after the injection molding process.

Figure 7:
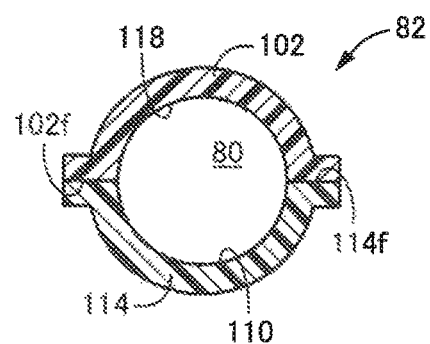
FIG. 7 is a cross sectional view of the oil piping assembly taken in a direction indicated by lines VII-VII in FIG. 4.

Then, the first and second divisional components 102 and 104 are integrally bonded to the respective first and second half components 114 and 116 of the base divisional component 100, by a vibration welding process. Namely, the first divisional component 102 and the first half component 114 are pressed in the respective leftward and rightward directions as seen in FIG. 5, for pressing fluid-tight contact of the interfacial surfaces 102*f* and 114*f* with each other in the direction substantially perpendicular to these surfaces 102*f* and 114*f*, while the components 102 and 114 are vibrated in the directions perpendicular to the plane of the view of FIG. 5 such that the interfacial surfaces 102*f* and 114*f* are kept in pressing sliding contact with each other, whereby these interfacial surfaces 102*f* and 114*f* are welded together due to generated friction heat. As a result, the first pipe portion 82 having the first passage portion 80 is obtained. FIG. 7 is the schematic cross sectional view of the first pipe portion 82 taken in a direction indicated by lines VII-VII in FIG. 4, namely, taken in a plane substantially perpendicular to the direction of flow of the lubricant oil 48 through the first pipe portion 82. The first divisional component 102 and the first half component 114 cooperate to define a substantially annular shape as seen in the cross sectional view of FIG. 7. That is, the components 102 and 114 have respective symmetrical semi-circular cross sectional shapes having substantially equal arcuate dimensions with regard to the circumferential direction of the first passage portion 80, and are bonded together with the interfacial surfaces 102$f$ and 114$f$ of the components 102 and 114 being held in contact with each other. Further, the thus formed first pipe portion 82 has two flanges extending radially outwardly from its respective two circumferential positions at which the interfacial surfaces 102$f$ and 114$f$ are held in contact with each other. These flanges are formed along an entire length or a part of the length of the first pipe portion 82, as needed.

Similarly, the second divisional component 104 and the second half component 116 are pressed in the respective leftward and rightward directions as seen in FIG. 5, for pressing fluid-tight contact of the interfacial surfaces 104$f$ and 116$f$ with each other in the direction substantially perpendicular to these surfaces 104$f$ and 116$f$, while the components 104 and 116 are vibrated in the directions perpendicular to the plane of the view of FIG. 5, or in the upward and downward directions, such that the interfacial surfaces 104$f$ and 116$f$ are kept in pressing sliding contact with each other, whereby these surfaces 104$f$ and 116$f$ are welded together due to friction heat. As a result, the second pipe portion 86 having the second passage portion 84 is obtained. The thus obtained second pipe portion 86 is connected to the first pipe portion 82, whereby the desired oil piping assembly 70 is manufactured. Like the first pipe portion 82, the second pipe portion 86 has two flanges (not shown) extending radially outwardly from its respective two circumferential positions at which the interfacial surfaces 104$f$ and 116$f$ are held in contact with each other. These flanges are formed along an entire length or a part of the length of the second pipe portion 86, as needed. In the vibration welding process to weld the first and second divisional components 102 and 104 to the respective first and second half components 114 and 116 of the base divisional component 100, the interfacial surfaces 102$f$, 104$f$, 114$f$ and 116$f$ may be heated by exposure to infrared rays, as needed, before the vibration welding operation is performed together with the pressing operation.

The lubricating device 40 of the transaxle 12 according to the present first embodiment described above is configured such that the base divisional component 100 which is one of the plurality of divisional components 100, 102 and 104 of the oil piping assembly 70 is provided with the plurality of fixing portions 72$a$, 72$b$ and 72$c$, so that the oil piping assembly 70 is fixed through only these fixing portions 72$a$, 72$b$ and 72$c$ to the structural member of the transaxle 12 at a plurality of positions. This structural member takes the form of the casing 14 or the housing of the first oil pump P1 disposed within the casing 14. Accordingly, even where a load is applied to the plurality of fixing portions 72$a$, 72$b$ and 72$c$, with a result of a relative displacement of the fixing portions 72$a$, 72$b$ and 72$c$, due to a difference in thermal expansion coefficient between the oil piping assembly 70 and the structural member (casing 14 or first oil pump P1), and/or vibration of the transaxle 12, this load acts on only the base divisional component 100, so that the other divisional components 102 and 104 are displaceable following a displacement of the base divisional component 100, whereby a load acting on the interfacial portions of the divisional components 100, 102 and 104 bonded together can be reduced. As a result, the state of bonding of the base divisional component 100 to the other divisional components 102 and 104 is stably maintained irrespective of the above-indicated difference of the thermal expansion coefficient and/or vibration, so that it is not necessary to increase the areas of the interfacial surfaces 102$f$ and 114$f$, and 104$f$ and 116$f$, for increasing the strength of bonding of the divisional components 100, 102 and 104. In addition, the oil piping assembly 70 can be manufactured with reduced weight and size at a reduced cost of manufacture, and can be compactly disposed in a limited space within the casing 14 of the transaxle 12, for example.

The lubricating device 40 is further configured such that the lubricant oil 48 delivered from the first oil pump P1 is delivered through the oil piping assembly 70 to the lubricated portions in the form of the bearings 62 and the gears 64, and the fixing portion 72$a$ which is one of the plurality of fixing portions 72$a$, 72$b$ and 72$c$ is fixed to the housing of the first oil pump P1. Further, the base divisional component 100 is provided with the connecting portion in the form of the connector port 92 connected to the first oil pump P1. Accordingly, the base divisional component 100 is positioned by the first oil pump P1, so that a risk of dislocation of the connector port 92 relative to the first oil pump P1 can be reduced, so that it is possible to reduce a load acting on the oil piping assembly 70 due to a strain generated as a result of the dislocation of the connector port 92 during assembling of the oil piping assembly 70, whereby a required degree of strength of the oil piping assembly 70 including the base divisional component 100 can be reduced. Accordingly, the oil piping assembly 70 can be manufactured with reduced size and weight.

It is noted that where the connector port 92 connected to the first oil pump P1 was provided on the divisional component other than the base divisional component 100, for example, on the first divisional component 102, application of a load causing a relative displacement between the connector port 92 and the fixing portion 72$a$ due to differences of thermal expansion coefficient among various parts of the lubricating device 40 and/or due to vibrations of those parts would cause application of a load between the base divisional component 100 and the other divisional component 102 provided with the connector port 92, which two components 100 and 102 are bonded together, so that these two components 100 and 102 might be separated from each other. However, the connector port 92 and the fixing portion 72$a$ are both provided on the base divisional component 100, so that the load to be applied between the base divisional component 100 and the other component 102 can be reduced, whereby the state of mutual bonding of the base and other divisional components 100 and 102 is stably maintained.

The lubricating device 40 is also configured such that the second half component 116 of the base divisional component 100, and the second divisional component 104 are provided with the plurality of hollow nozzle portions 76. Each of these hollow nozzle portions 76 has the delivery nozzle 78, which is open externally of the hollow nozzle portion 76. Accordingly, the lubricant oil 48 can be adequately delivered to the lubricated portions of the transaxle 12, such as the bearings 62 and the gears 64, through the hollow nozzle portions 76, by suitably determining lengths of the hollow nozzle portions 76 and/or the direction in which the delivery nozzles 78 are open.

The lubricating device 40 is further configured such that the interfacial surface 114f of the first half component 114 of the base divisional component 100, and the interfacial surface 102f of the first divisional component 102 are subjected to the vibration welding process, while the interfacial surface 116f of the second half component 116 of the base divisional component 100, and the interfacial surface 104f of the second divisional component 104 are subjected to the vibration welding process, so that the base divisional component 100 is bonded to the first and second divisional components 102 and 104. To increase the strength of bonding of the divisional components 100, 102 and 104 for preventing a risk of separation of the interfacial surfaces 114f and 102f from each other and separation of the interfacial surfaces 116f and 104f from each other, due to the differences of thermal expansion coefficient among the various parts of the lubricating device 40 and/or vibrations of those parts, it is required to increase the areas of the interfacial surfaces 114f, 102f, 116f and 104f, so that the weight and size of the oil piping assembly 70 are increased. In the present embodiment, however, the plurality of fixing portions 72 are all provided on the base divisional component 100, so that a load applied between the base divisional component 100 and the first and second divisional components 102 and 104 due to the above-indicated thermal expansion coefficient differences and/or vibrations is reduced, whereby the state of mutual bonding of the divisional components 100, 102 and 104 can be stably maintained. Accordingly, the present lubricating device 40 is not required to increase the above-indicated strength of bonding, assuring an outstanding advantage that the oil piping assembly 70 can be manufactured with reduced size and weight.

The lubricating device 40 is also configured such that the interfacial surfaces 114f, 102f, 116f and 104f are bonded together by welding, so that the oil piping assembly 70 can be more easily manufactured than where those interfacial surfaces are bonded together with an adhesive agent, since the bonding by welding does not require the use of an adhesive agent, and coating of the interfacial surfaces with the adhesive agent.

The lubricating device 40 is further configured such that the oil piping assembly 70 formed of the resin material includes: the base divisional component 100 wherein the first half component 114 and the second half component 116 are connected to each other through the connecting pipe portion 90; the first divisional component 102 cooperating with the first half component 114 to define the first passage portion 80; and the second divisional component 104 cooperating with the second half component 116 to define the second passage portion 84. The first and second passage portions 80 and 84 are connected to each other through the connecting passage portion 88 formed through the connecting pipe portion 90. Accordingly, the oil piping assembly 70 which has the first passage portion 80, the second passage portion 84 and the connecting passage portion 88 and which provides the first oil supply passage 42 can be configured to have a comparatively complicated three-dimensional structure, so that the oil piping assembly 70 can be compactly disposed in a narrow space within the casing 14 of the transaxle 12, which space has a complicated shape, and permits supply of the lubricant oil 48 in a pin-pointing manner to the bearings 62 and the gears 64, whereby the required volume of the lubricant oil 48 can be reduced.

Other embodiments of this invention will be described. It is noted that the same reference signs as used in the first embodiment will be used to identify the corresponding elements of the following embodiments, which will not be described redundantly.

Figure 9:
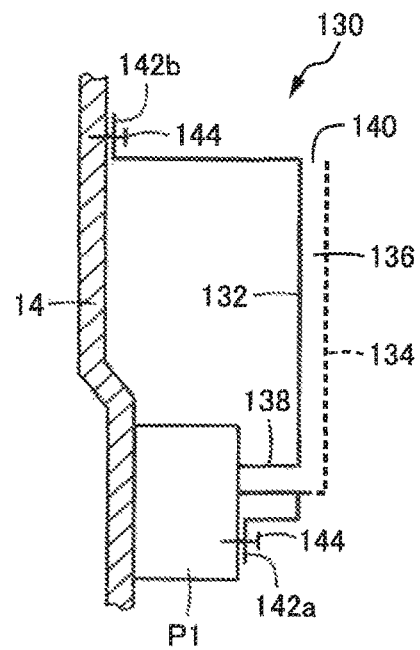
FIG. 9 is a schematic view for explaining an oil piping assembly according to another embodiment of this invention, together a structure for fixing the oil piping assembly.

Referring to FIG. 9 which is the schematic view corresponding to FIG. 8, there is shown an oil piping assembly 130 according to a second embodiment of this invention. The oil piping assembly 130 is made of resin material. The oil piping assembly 130 includes a base divisional component 132 indicated by a solid line, and another divisional component 134 indicated by a broken line. The base divisional component 132 and the divisional component 134 are bonded together by welding or with an adhesive agent, with interfacial surfaces thereof held in contact with each other, so as to form an oil passage 136 through which the lubricant oil 48 flows. This oil piping assembly 130 is provided to supply the lubricant oil 48 delivered from the first oil pump P1, to the lubricated portions such as the bearings 62 and the gears 64, or to the above-described heat exchanger 66 or valve bodies, for example. The base divisional component 132 is provided at its lower end portion with an integrally formed connector port 138 connected to the first oil pump P1. The oil passage 136 has a connector fitting 140 as a connecting portion formed at its upper open end. The oil passage 136 is connected through this connector fitting 140 to other piping or hydraulic circuit parts. The connector fitting 140 may be replaced by a connector port which is similar to the connector port 138 and which is provided on the base divisional component 132 or the divisional component 134.

The base divisional component 132 is also provided with a fixing portion 142a to be fixed to the housing of the first oil pump P1, and a fixing portion 142b to be fixed to the casing 14. These fixing portions 142a and 142b are spaced apart from each other along the length of the oil passage 136. The oil piping assembly 130 is disposed at a predetermined position within the casing 14, by fixing the fixing portions 142a and 142b to the first oil pump P1 or the casing 14 with fastening members 144 such as bolts. Namely, the oil piping assembly 130 is fixed within the casing 14 through only the pair of fixing portions 142a and 142b provided on the base divisional component 132. Accordingly, the oil piping assembly 130 has substantially the same advantages as the oil piping assembly 70 of the first embodiment.

Figure 10:
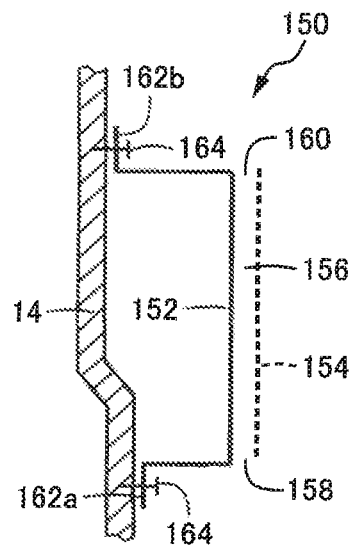
FIG. 10 is a schematic view for explaining an oil piping assembly according to a further embodiment of the invention, together with a structure for fixing the oil piping assembly.

Referring to FIG. 10 which is the schematic view corresponding to FIG. 8, there is shown an oil piping assembly 150 according to a third embodiment of this invention. The oil piping assembly 150 is made of resin material. The oil piping assembly 150 includes a base divisional component 152 indicated by a solid line, and another divisional component 154 indicated by a broken line. The base divisional component 152 and the divisional component 154 are bonded together by welding or with an adhesive agent, with interfacial surfaces thereof held in contact with each other, so as to form an oil passage 156 through which the lubricant oil 48 flows. This oil piping assembly 150 is disposed at an intermediate position of the first oil supply passage 42 or second oil supply passage 44 shown in FIG. 2. The oil passage 156 has connector fittings 158 and 160 as connecting portions formed at its lower and upper open ends. The oil passage 156 is connected through these connector fittings 158 and 160 to other piping or hydraulic circuit parts. The connector fittings 158 and 160 may be replaced by connector ports which are similar to the connector port 92 and which are provided on the base divisional component 152 or the divisional component 154.

The base divisional component 152 is also provided with a pair of fixing portions 162a and 162b to be fixed to the casing 14. These fixing portions 162a and 162b are spaced apart from each other along the length of the oil passage 156. The oil piping assembly 150 is disposed at a predetermined position within the casing 14, by fixing the fixing portions 162a and 162b to the casing 14 with fastening members 164 such as bolts. Namely, the oil piping assembly 150 is fixed within the casing 14 through only the pair of fixing portions 162a and 162b provided on the base divisional component 152. Accordingly, the oil piping assembly 150 has substantially the same advantages as the oil piping assemblies 70 and 130 of the first and second embodiments.

Figure 11:
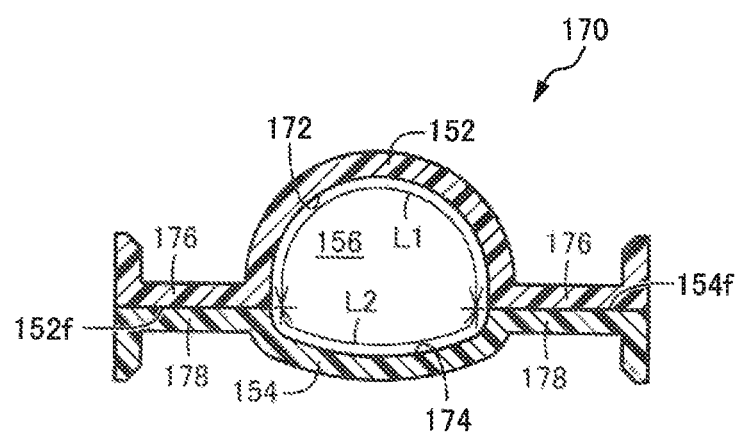
FIG. 11 is a cross sectional view of an oil piping assembly according to a still further embodiment of the invention, which is taken in a plane perpendicular to a direction of flow of a lubricant oil through the oil piping assembly.

The base divisional component 152 and the divisional component 154 of the oil piping assembly 150 which cooperate to define the oil passage 156 have respective symmetrical semi-circular cross sectional shapes having substantially equal arcuate dimensions with regard to the circumferential direction, like the first divisional component 102 and the first half component 114 shown in FIG. 7. The divisional components 152 and 154 of an oil piping assembly 170 according to a fourth embodiment of the invention shown in FIG. 11 have different cross sectional shapes. This oil piping assembly 170 has the same arrangement as the oil piping assembly 150, except for the cross sectional shapes of the divisional components 152 and 154. In FIG. 11, the same reference signs as used in FIG. 10 are used to identify the corresponding elements of the fourth embodiment, which will not be described redundantly. FIG. 11 is the cross sectional view of the oil piping assembly 170, which is taken in a plane perpendicular to a direction of flow of the lubricant oil 48 through the oil passage 156. In the cross sectional view of FIG. 11, a length L1 of an inner wall surface 172 of the base divisional component 152 is larger than a length L2 of an inner wall surface 174 of the divisional component 154. In the present embodiment, the inner wall surface 172 of the base divisional component 152 is a U-shaped surface consisting of a semi-circular part and a pair of straight parts extending from respective opposite ends of the semi-circular part, while the divisional component 154 per se also has U-shaped cross sectional shape partly defining the oil passage 156. The inner wall surface 174 of the divisional component 154 has a slightly arcuate cross sectional shape almost following a straight line, and the cross sectional shape of the divisional component 154 partly defining the oil passage 156 is similar to that of a shallow dish having an almost straight bottom surface. The base divisional component 152 and the divisional component 154 have respective pairs of flanges 176 and 178 extending radially outwardly from respective ends of the respective inner wall surfaces 172 and 174, so that interfacial surfaces 152f and 154f of the divisional components 152 and 154 to be bonded together by welding, for example, have comparatively large areas.

Figure 12:
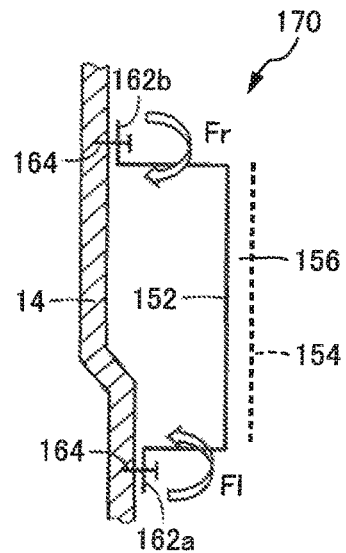
FIG. 12 is a view indicating torsional loads Fr and Fl applied to a pair of fixing portions of the oil piping assembly of FIG. 11.

The oil piping assembly 170 according to the fourth embodiment described above is configured such that the length L1 of the inner wall surface 172 of the base divisional component 152 is larger than the length L2 of the inner wall surface 174 of the divisional component 154, in cross section in the plane of view of FIG. 11 perpendicular to the direction of flow of the lubricant oil 48 through the oil passage 156, so that the base divisional component 152 has a high degree of rigidity resistant to twisting and bending of the base divisional component 152, whereby it is possible to reduce a degree of twisting or other deformation of the oil piping assembly 170 at the bonding interface between the base divisional component 152 and the divisional component 154, where the base divisional component 152 is fixed to the casing 14 as shown in FIG. 12, for example, and when a load is applied to the base divisional component 152 through the pair of fixing portions 162a and 162b, due to the difference in thermal expansion coefficient between the oil piping assembly 170 and the casing 14, and/or due to vibration of the transaxle 12. Accordingly, the load applied to the bonding interface is reduced, so that the state of mutual bonding of the base and another divisional components 152 and 154 can be further stably maintained. In the example of FIG. 12, a torsional load Fl in the counterclockwise direction as seen in the downward direction in FIG. 12 acts on the fixing portion 162a, while a torsional load Fr in the clockwise direction as seen in the downward direction acts on the other fixing portion 162b. The torsional loads Fl and Fr also act on the divisional component 154 partly defining the oil passage 156. However, the high degree of rigidity of the base divisional component 152 having the U-shaped cross sectional inner wall surface 172 makes it possible to reduce the degree of deformation of the base divisional component 152 due to the torsional loads Fl and Fr, and to reduce the load applied to the bonding interface of the base divisional component 152 with respect to the divisional component 154. Since the state of bonding between the divisional components 152 and 154 is stably maintained, durability of the bonding interface is improved, so that the oil piping assembly 170 can be manufactured with reduced size and weight.

Figure 13:
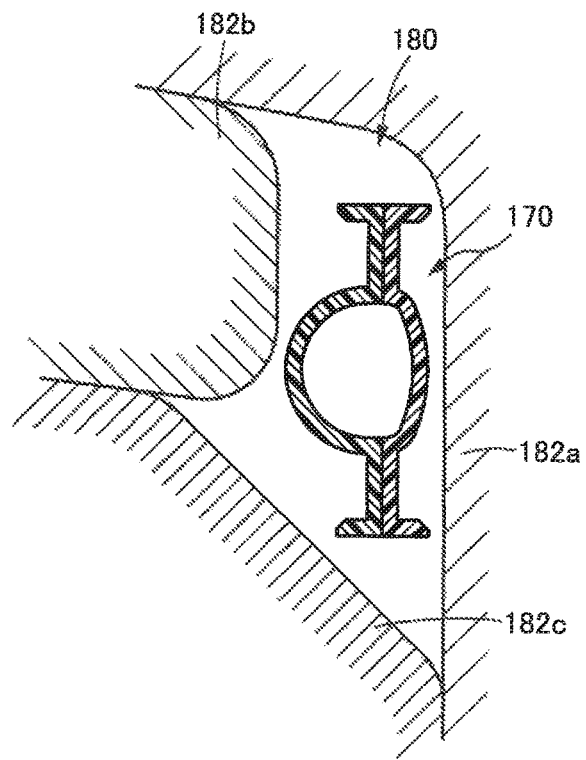
FIG. 13 is a cross sectional view showing an example of disposition of the oil piping assembly of FIG. 11.

In addition, the flanges 176 and 178 are offset from a center of the oil passage 156 in the cross sectional plane of FIG. 11, to assure a high degree of strength of bonding of the divisional components 152 and 154, so that the oil piping assembly 170 can be installed even in a generally elongate narrow space 180 within the casing 14, as shown in FIG. 13, by way of example, by suitably determining the distance of offsetting of the flanges 176 and 178 from the center of the oil passage 156, and an attitude of installation of the oil piping assembly 170 depending upon a specific geometry of the space 180. Thus, the oil piping assembly 170 has a relatively high degree of freedom regarding its installation within the space 180. Further, the flanges 176 and 178 may have different dimensions, or asymmetric configurations, along an entirety or a part of the length of the oil piping assembly 170. In the example of FIG. 13, the structural member of the power transmitting system consists of a plurality of casing members 182a, 182b and 182c, which cooperate to define the elongate narrow space 180. However, the oil piping assembly 170 may be disposed within a limited space defined by gears and other components of the power transmitting system.

Like the oil piping assembly 170, the oil piping assembly 70, 130 may consist of two divisional components having respective different shapes in cross section in the plane perpendicular to the direction of flow of the lubricant oil 48 through the oil passage, as shown in FIG. 11.

While the preferred embodiments of the invention have been described for illustrative purpose only, it is to be understood that the present invention may be embodied with various changes and improvements, which may occur to those skilled in the art.

NOMENCLATURE OF ELEMENTS

12: transaxle (power transmitting system)
14: casing (structural member)
40: lubricating device
42: first oil supply passage (oil passage)
48: lubricant oil
62: bearings (lubricated portion)

64: gears (lubricated portion)
70, 130, 150, 170: oil piping assembly (resin piping assembly)
72a, 72b, 72c, 142a, 142b, 162a, 162b: fixing portions
76: nozzle portions
78: delivery nozzles
80: first passage portion (oil passage)
84: second passage portion (oil passage)
92, 138: connector port (connecting portion)
100, 132, 152: base divisional component (divisional component)
102: first divisional component (divisional component)
102f, 104f, 114f, 116f, 152f, 154f: interfacial surface
104: second divisional component (divisional component)
134, 154: divisional component
136, 156: oil passage
172, 174: inner wall surface
182a, 182b, 182c: casing member (structural member)
L1: length of inner wall surface of base divisional component
L2: length of inner wall surface of another divisional component
P1: first oil pump (oil pump, structural member)

What is claimed is:

1. A lubricating device of a power transmitting system having a structural member, comprising an oil piping assembly fixed to the structural member at a plurality of positions and having an oil passage through which a lubricant oil flows, wherein
the oil piping assembly is a resin piping assembly including a plurality of divisional components which cooperate to define a circumference of the oil passage along a length of the oil passage and which are formed of a resin material, the divisional components having respective interfacial surfaces and being bonded together with interfacial surfaces thereof being held in contact with each other;
the plurality of divisional components of the resin piping assembly include a base divisional component provided with a plurality of fixing portions;
the plurality of fixing portions are provided only in the base divisional component among the plurality of divisional components;
the resin piping assembly being fastened to the structural member at the plurality of positions through only the plurality of fixing portions with a plurality of fastening members;
the plurality of fixing portions extends in a flowing direction in which the lubricant oil flows in the oil passage and includes respective fastening holes for the fastening members, the fastening holes extending in a direction perpendicular to the flowing direction,
the oil passage includes a first passage portion, a second passage portion and a connecting passage portion,
the connecting passage portion connects the first passage portion and the second passage portion, and a longitudinal direction of the connecting passage portion is perpendicular to longitudinal directions of the first passage portion and the second passage portion, and
the resin piping assembly is provided with a plurality of hollow nozzle portions that extend linearly in a direction parallel to the longitudinal direction of the connecting passage portion.

2. The lubricating device according to claim 1, further comprising an oil pump disposed within a casing of the power transmitting system, and wherein the resin piping assembly is connected to the oil pump, to deliver the lubricant oil,
and wherein one of the plurality of fixing portions is fastened to a housing of the oil pump functioning as the structural member, and the base divisional component is provided with a connecting portion which is connected to the oil pump and through which the lubricant oil flows from the oil pump into the resin piping assembly.

3. The lubricating device according to claim 2, wherein the resin piping assembly is provided to deliver the lubricant oil from the oil pump to predetermined lubricated portions of the power transmitting system, and
at least one of the plurality of divisional components including the base divisional component is provided with the plurality of hollow nozzle portions, each of the hollow nozzle portions having a delivery nozzle which is open externally of the hollow nozzle portion.

4. The lubricating device according to claim 1, wherein a length of an inner wall surface of the base divisional component partly defining the oil passage is larger than a length of an inner wall surface of another of the plurality of divisional components partly defining the oil passage, in a cross section taken in a plane perpendicular to a direction of flow of the lubricant oil through the oil passage.

5. The lubricating device according to claim 1, wherein the plurality of divisional components including the base divisional component are bonded together by welding with the interfacial surfaces thereof being held in contact with each other.

6. The lubricating device according to claim 1, wherein the plurality of divisional components of the resin piping assembly include the base divisional component provided with the plurality of fixing portions, a first divisional component and a second divisional component.

7. The lubricating device according to claim 6, wherein the first divisional component and the second divisional component are connected to the structural member only via the base divisional component.

8. The lubricating device according to claim 1, wherein an end of each of the plurality of hollow nozzle portions includes a delivery nozzle.

* * * * *